(12) United States Patent
Lynch

(10) Patent No.: US 7,273,552 B2
(45) Date of Patent: Sep. 25, 2007

(54) BIOREMEDIATION

(75) Inventor: James Michael Lynch, West Sussex (GB)

(73) Assignee: Forestry Commission, Edinburgh (GB)

( * ) Notice: Subject to any disclaimer, the term of this patent is extended or adjusted under 35 U.S.C. 154(b) by 79 days.

(21) Appl. No.: 10/496,542

(22) PCT Filed: Nov. 25, 2002

(86) PCT No.: PCT/GB02/05295

§ 371 (c)(1),
(2), (4) Date: Feb. 7, 2005

(87) PCT Pub. No.: WO03/045596

PCT Pub. Date: Jun. 5, 2003

(65) Prior Publication Data

US 2005/0126990 A1    Jun. 16, 2005

(30) Foreign Application Priority Data

Nov. 23, 2001 (GB) ................. 0128180.7

(51) Int. Cl.
  *C02F 3/32* (2006.01)
  *B09C 1/10* (2006.01)
  *A62D 3/00* (2006.01)

(52) U.S. Cl. ............. 210/602; 210/904; 210/912; 405/128.1; 405/128.45

(58) Field of Classification Search ............ 210/602, 210/150, 747, 904, 912; 435/177, 254.1, 435/256.5, 256.7, 262, 262.5; 405/128.1, 405/128.15, 128.45

See application file for complete search history.

(56) References Cited

U.S. PATENT DOCUMENTS

| 4,415,450 | A  | * | 11/1983 | Wolverton ............... 210/602 |
| 6,033,559 | A  | * | 3/2000  | Bender et al. ............ 210/150 |
| 6,143,549 | A  |   | 11/2000 | Lamar et al. |
| 6,204,049 | B1 |   | 3/2001  | Bennett et al. |
| 6,287,847 | B1 |   | 9/2001  | Knowles et al. |
| 2004/0261578 | A1 | * | 12/2004 | Harman et al. ............ 75/710 |

FOREIGN PATENT DOCUMENTS

| CA | 2313110 A1 | | 12/2001 |
| EP | 0125073 A2 | | 11/1984 |
| RU | 2176164 C | | 11/2001 |
| WO | WO94/25190 A1 | | 11/1994 |
| WO | WO 02/13615 | * | 2/2002 |

* cited by examiner

*Primary Examiner*—Fred G. Prince
(74) *Attorney, Agent, or Firm*—Foley & Lardner, LLP

(57) ABSTRACT

Bioremediatory fungi, such as *Trichoderma harzianum*, which have been found to catabolise cyanide, are capable of detoxifying contaminated environmental areas in association with a suitable rhizosphere.

23 Claims, No Drawings

BIOREMEDIATION

The present invention relates to methods of environmental detoxification using bioremediatory organisms.

Many industrial processes produce large amounts of toxicants, and this has been true ever since the start of the industrial revolution. Since the early 1960's, there has been a growing public awareness of the effect that the by-products of industry are having on the environment and, in recent years, legislation has been passed in many countries worldwide, requiring the industries in question to control these by-products. Even so, it is often difficult to completely prevent some adverse impact on the environment.

On a global scale, such environmental disasters as the wrecks of the Torrey Canyon and the Exxon Valdez have particularly alarmed the public, but it is quite often the less well reported incidents which are considerably more dangerous. For example, a recent cyanide-tainted waste spill from an Australian owned gold mine in Romania did very substantial damage to the entire ecosystem of the River Tizsa. This river runs through Romania, Hungary and Yugoslavia, and the spill effectively wiped out not only the wild life in the river itself, but also substantial parts of the local economy dependent on the river, as well as laying waste to the surrounding countryside. The overall effect of this disaster is disputed, but the river and its dependent ecosystems will not fully recover for decades, under normal conditions.

On a slightly more mundane level, coal gasification to produce methane gas was common throughout the western world until the mid-1960's. Although this process is now no longer generally used, thousands of contaminated sites remain. These sites are generally completely unsuitable for growth of crops, and are frequently completely barren. Contaminants of such sites include inorganic compounds, such as sulphur and cyanide, heavy metals and polyaromatic hydrocarbons (PAH's).

Many other industrial processes also produced, and produce, large amounts of toxic waste material and, whilst this is now better controlled than in the past, it is estimated that, for the time being, in order to reclaim polluted sites worldwide, it will cost in the region of billions of dollars per year.

Whilst the problem is now well recognised, the solution has generally been to excavate polluted sites and to remove the contaminated material, perhaps to the sea or to a suitable landfill site. This strategy is not environmentally sound.

*P. chrysosporium* is known to be of use in the degradation of aromatic environmental pollutants, such as PAH's. This it does when provided with lignin, which it digests, with the concomitant production of oxidative free radicals. These free radicals are then harnessed to degrade the aromatic pollutants.

U.S. Pat. No. 6,204,049, discloses the use of alginate gel beads comprising an inoculum of *M. troyanus* or a white rot fungi, such as *P. chrysosporium*, and a source of nutrients, such as sawdust, corncob grits, peat or cereal grains, in helping to remove contaminants from an area. There is no suggestion that the cereal grains are intended to grow.

A method of propagating a fungus, such as *P. chrysosporium*, for use in decontamination, is taught in U.S. Pat. No. 6,143,549, which comprises the construction of a pellet and its use as a fungal inoculum, such as for the treatment of pentachlorophenol (PCP) contaminated soil.

WO 94/25190 also relates to a method of clearing an area of contaminants using a microorganism, such as *P. chrysosporium*, capable of producing free radicals that initiate breakdown of the contaminants, in intimate mixture with biomass. Although some nutrients for the microorganism are gleaned from the lignin or cellulose, the process of radical production, essential to contaminant removal, is adversely affected by high nitrogen levels.

CA-A-2 313 110 teaches the use of *Rhizobium* bacteria in treating contamination of an area, as well as a method of isolating these bacteria. *Fusarium* and *Trichoderma* are mentioned, but not as being useful in the disclosed methods.

RU-A-2176164 teaches that *Actinomyces* spp. and *Azotobacter chroococcum* can be used in the treating soil polluted with crude oil and petroleum products. Leguminous or cereal seeds are soaked in an aqueous preparation of these bacteria and then sown in the polluted ground. The plants resulting from these seeds were not able to grow without being leaf-fed with mineral fertilisers.

Some work has been done to investigate bioremediation, in which organisms of various species are used to assist in reclaiming polluted land. For example, in U.S. Pat. No. 6,287,847, there is disclosed a range of fungi which were able to be cultivated from a sample of soil contaminated with high levels of Prussian Blue, a complexed cyanide. The dominant fungus was found to be *Fusarium solani*. Other species included *Trichoderma polysporum, Penicillium miczynski, Fusarium oxysporum* and *Schytalidium thermophilum*. Other than the main *Fusarium solani*, it is not clear that any of the other isolates had any affinity for the contaminated soil or were able to grow in the absence of *Fusarium solani*.

*Fusarium* spp. are also used to produce industrial quantities of cyanide hydratase, as exemplified in U.S. Pat. No. 5,219,750.

In order to use *Fusarium* spp. in bioremediation, it is not sufficient simply to treat the affected area with this organism, but it is actually necessary to process the soil through a culture of *Fusarium*. Otherwise, little or no effect is observed. Such a process is prohibitively expensive, and substantially more unattractive, economically, than simply digging up the polluted site and dumping the material elsewhere. In addition, *Fusarium* spp. are often phytotoxic, and even non-toxic strains are generally unstable, and can frequently mutate to phytotoxic strains very easily. Thus, there is very little incentive to use *Fusarium* in bioremediation, at least for arable land.

It is an object of the present invention to provide a soil treatment which is both economically viable and environmentally friendly.

We have now, surprisingly, found that bioremediation of contaminated sites can be readily effected by the use of a bioremediatory organism in association with a supplementary source of nutrients therefor.

Thus, in a first aspect, there is provided a method for the detoxification of an environmental area, comprising the application to said area of a bioremediatory fungus or spores thereof, together with a compatible rhizosphere, or progenitor therefor.

Various bioremediatory fungi are available, and are discussed below. These and/or their spores, may be provided as spawn or in other suitable form for application to the area to be treated. The spawn may comprise seeds of the plants suitable to provide the rhizosphere, although this will not generally be the case.

Seeds treated with a spore preparation have been found to work well, with seedlings being protected from levels of cyanide that would otherwise preclude their growth. The seeds may be coated with a mycelial preparation, although this is not generally desirable, as the mycelium may well die before the seed sprouts.

The method of the invention may also comprise the use of a rooting plant already associated with a suitable fungus, or the two may be separately applied, as with preparations of spores and seeds. It will be appreciated that more than one plant and/or more than fungus may be employed in the present invention, often to beneficial effect.

A rhizosphere is a root environment conducive to the sustained growth of the selected fungus or fungi. At its simplest, this can comprise a root in water, although this may not encourage fungal growth. More typically, the rhizosphere will comprise growth medium, such as soil or compost, and it may be desired to plant seeds, seedlings or young plants in such medium in the contaminated area, in order to provide encouragement for growth before having to rely on the contaminated soil. However, it is an advantage of the present invention that it is often sufficient simply to employ seeds and a preparation of fungal spores, preferably coated on the seeds.

The co-metabolism of the plants and fungi allows both the plants and the fungi to continue growing in an environment where neither would grow well, if at all, and can be considered to provide a synergistic or symbiotic relationship, in this regard.

It will be appreciated that the nature and the extent of the detoxification of the area will be dependent on a number of parameters, such as the type and the seriousness of the contamination of the area to be detoxified, as well as the phenotype, amount and number of varieties of organisms used in the detoxification process. For example, use of *Fusarium* spp. would assist in the catabolism of cyanides, whilst white rot is able to assist in the removal of PAH's.

In any event, the more thorough and persistent the treatment of the area is, the greater the detoxification effect.

The environment to be treated will generally be an area of land, but may also be a body of water, for example. Examples of the how these may be detoxified are provided below.

The bioremediatory fungi of the present invention may be any that are suitable to assist in the catabolism, destruction or removal of an unwanted contaminant from an environmental area. In the case of heavy metals, for example, these may be mobilised by the fungus for uptake by a plant, for example. In other cases, where the contaminant is a cyanide or organic compound, for example, these may be suitably catabolised/metabolised to render them harmless, or even useful by the fungi of the invention. Where plants are used in the uptake of heavy metals, for example, these may be harvested and removed from the environment, so as to reduce the levels of the metal in the area.

What has surprisingly been found is that, by simply providing a compatible rhizosphere, the fungi of the present invention are capable of protecting the plant and are able to use the rhizosphere to continue growing in the contaminated environment and, with such continued growth, they are more able to detoxify their environment, as they are able to process larger amounts of contaminant through higher metabolic rates. While it is true, in the case of cyanides for example, that the cyanide provides a source of nitrogen, contaminated environments tend to be very low in other sources of nutrition. Accordingly, when bioremediatory fungi, alone, are applied to such environments, the level of growth is usually very poor, or non-existent.

It is generally an advantage of the present invention that the combination of fungus and rhizosphere in the environment to be decontaminated is self-sufficient, in that no extra nutrients, other than water and sunlight, are needed. A particular example is *Trichoderma* with an appropriate rhizosphere in a cyanide contaminated environment.

A supplementary source of nutrients may be added in order to encourage growth, as described above. Such an added source may, if desired, be carefully selected to be appropriate for the environment, or so as to complement the nutrients that may already be there, or in order to have a controlling effect, for example. It may also be selected so as to provide a source of nutrients that would support growth of the fungus, even if it were not introduced into the contaminated environment to be detoxified.

In a preferred embodiment, plant seeds are pre-treated with fungal spores or propagules, and then sown in the contaminated area. The growing fungus protects the seedlings from the contaminants in the area, whilst the seedlings generate the nutrients required for the fungi. This had not previously been shown to be possible, but has now been shown to work, with species of *Trichoderma*, for example. *Trichoderma* is a well known type of fungus which has been investigated for its properties as a biocontrol agent, such as is disclosed in U.S. Pat. No. 5,260,213, and as plant growth stimulators [cf. Ousley, M. A., et al., Biol. Fertil. Soils (1994) 17:85-90]. In the first of these, *Trichoderma* spp., together with other species, such as *Enterobacter cloacae*, is shown to protect seedlings from the fungus responsible for the phenomenon of "damping off". In the latter case, even without the damping off fungus being present, it is shown that seedlings can be stimulated by the presence of *Trichoderma* spp.

However, not all species and strains of *Trichoderma* are consistently able to stimulate growth of seedlings and, in fact, depending on the circumstances, may even inhibit germination and growth. However, it has now, surprisingly, been found that many strains of *Trichoderma* are actively able to catabolise cyanides and that, in the presence of a cyanide, strains which otherwise exhibit, or occasionally exhibit, a tendency to inhibit germination of seedlings either partially or completely lose this tendency. Indeed, experiments with concentrations of cyanide up to 10 mM have shown that, in the presence of *Trichoderma* spores, lettuce seeds germinate and grow as well as they would in the absence of the cyanide.

In particular, it has been established that *Trichoderma* is capable of populating the rhizosphere of many plants, and that this can be achieved and encouraged by any of various means. One such means is simply to treat the seeds of a plant with a dried preparation of propagules, or spores, of *Trichoderma*. The propagules may also be applied as a solution, and the seeds dried, or the propagules may be applied via a solid matrix, such as with powdered lignite. It will also be appreciated that, while seeds are generally referred to herein, the invention also applies to other forms of the plant that can be used to colonise, or grow, in an area, such as dried or dormant roots, corms, rhizomes, bulbs or other propagative tissue, and that term "seeds" includes reference to such other forms, unless otherwise apparent or indicated.

Once in a suitable environment, the fungal propagules start growing, as do the seeds, and the fungus protects the seeds from the effects of the contaminants. As the seedlings develop, the fungi associate with the root systems of the new plants, and derive nutrients therefrom, thereby accelerating the growth and metabolism of the fungi, and thereby also serving to increase the catabolic effect on the toxicants in the contaminated environmental area.

A suitable plant for the treatment of such areas is generally preferably not a food crop plant. This is generally for safety reasons, as the toxicants in the area may well contaminate any plants that do successfully grow to an extent where they are unsafe for human or animal consumption.

Any suitable plant, such as a grass, may be used, but it is generally preferred to use plants which can otherwise enrich the soil and take up heavy metals. Such plants generally include the legumes and ferns, and suitable species include the various clovers, such as the red and the white clovers, and types of brake fern. Where it is desired that the legume be generally unappealing to livestock, then a suitable non-food crop legume is vetch. Vetch seeds may be treated with *Trichoderma* propagules and also, if desired, propagules of an appropriate *Rhizobium*. On germination, the *Rhizobium* can then adopt a symbiotic relationship with the seedling in order to fix nitrogen and the whole plant can serve to provide suitable nutrients to the *Trichoderma* fungus.

Suitable varieties of ferns are disclosed in U.S. Pat. No. 6,302,942, which is hereby incorporated by reference. These ferns are capable of the hyperaccumulation of arsenic from contaminated sites, and are particularly useful in the present invention.

In the case of a body of water, it will be necessary to select an fungus capable of underwater growth, and this may be associated with seaweed, such as bladderwrack, for example, which may have been dried prior to use, or pond weed. In the latter case, for example, *Phragmites* spp. (reedbed) has previously been used in bioremediation efforts and, in accordance with the present invention, there is provided the use of *Phragmites*, or other suitable reedbed vegetation, in association with a bioremediatory fungus.

In EP-A-125073, there is disclosed a method for disposing of unwanted straw left in fields after the harvest. The straw is decomposed by inoculation with a dinitrogen-fixer, such as *Clostridium butyricum*. This is needed, as straw contains very little nitrogen, and can actively inhibit growth of the following year's crop. The effect can be further enhanced by treatment with *Trichoderma* spp., which serve to degrade the cellulose in the straw. Indeed, the effect is even further enhanced by the addition of a polysaccharide producer, such as *Enterobacter* spp., especially *Enterobacter cloacae*, which serves to excrete large amounts of polysaccharide which both protects and encourages the other fungi to grow.

Thus, it has been established that *Trichoderma* spp. are excellent at colonising straw. *Trichoderma harzianum* is both cellulolytic and ligninolytic, and thus able to make full use of the straw.

It will be readily appreciated that, where it is desired to provide an additional source of nutrients in this fashion, then it is not necessary for this supplementary source of nutrients to be limited to straw, in these circumstances, and that any dead plant material may be used, including various varieties of straw, leaves, sawdust and bark, for example, or pondweed in the case of bodies of water, for instance. When straw is referred to herein, it will be appreciated that any other suitable dried plant material may be substituted for the straw, in the context, unless otherwise apparent or indicated.

When used in the present invention, straw may be suitably populated, or inoculated, with *Trichoderma* prior to application to the environmental site, or the straw and *Trichoderma* may be separately applied. In such circumstances, it is generally preferred to apply the straw first, and then to spray on a preparation, suitably a liquid preparation, of the *Trichoderma*. The resulting top dressing may then be left in order to allow adequate population of the straw by the *Trichoderma*, but it is preferred not to simply leave this as a top dressing, as the *Trichoderma* will not come into sufficient contact with the contaminants in the area. Accordingly, it is preferred that, once the *Trichoderma* and straw have been applied to the area, then the top dressing is tilled, or otherwise incorporated into the environmental area, optionally after allowing the straw to become associated with a suitable population of *Trichoderma*.

It will be appreciated that the rhizosphere or its progenitor may be introduced at any suitable stage, but it is generally preferred that the ground be pre-treated with straw and fungus prior to introduction of the plant, so as to provide a more conducive growing environment for the plant or plants.

The straw may also be pre-treated with *Trichoderma*. This may occur immediately prior to treatment of the area, or the preparation may be made substantially beforehand to create a mulch, for example. In one preferred embodiment, the preparation is dried prior to use, and then moistened in a manner similar to that described above.

It may also be advantageous to treat the straw with one or other of *Clostridium butyricum* and an *Enterobacter* spp., especially *Enterobacter cloacae*. It is more preferred that the straw be treated with both of these, in addition to *Trichoderma*. Other species may also be added to the straw or the rhizosphere, such as *pseudomonas* spp.

While it is desirable that the straw be actively populated by at least the *Trichoderma* prior to application to the environmental area, it should also be noted that an active population will already have used up some of the available nutrients in the straw and that, once the nutrients capable of being provided by the straw have been used, it is quite likely that the *Trichoderma* will cease to actively propagate. At this point, continued growth is generally ensured by the rhizosphere.

The present invention also envisages the addition, whether prior, subsequent or contemporaneous, of other suitable dead plant material, such as bark, to provide a longer term source of nutrients. Thus, an area may be treated with straw and *Trichoderma*, and also treated with bark, whether as a mulch or a treatment. When the source of nutrients from the straw expires, the bark can then provide nutrients, as *Trichoderma*, for example, is also capable of using this as a food source. It will be appreciated that the bark may have been treated with *Trichoderma* prior to use.

As used herein, it will be appreciated that the term *Trichoderma* includes reference to any other suitable fungus capable of an appropriate level of bioremediation, unless otherwise excluded by the context.

As noted above, *Trichoderma harzianum* is particularly useful for association with straw. In addition, *T. harzianum* strains are often particularly useful in the catabolism of cyanides. It is well within the skill of those in the art to establish both the ability of a strain of *Trichoderma* to grow in the presence of cyanide, as well as to establish the level of degradation of cyanide of which the individual strains are capable. A suitable assay for cyanide is as described in Dartnall & Bums [Biol. Fertil. Soils (1987) 5:141-147]. In general, those strains capable of high catabolism of cyanides also act as plant growth stimulators.

It is also well within the scope of those skilled in the art to establish strains of *Trichoderma* capable of uptake and catabolism of other contaminants, such as PAH's, and such strains are preferred.

In addition, other fungi, such as white rot, are encompassed within the scope of the present invention. White rots are excellent at the disposal of PAH's and, in common with *Trichoderma*, for example, grow well and provide good levels of detoxification in association with supplementary sources of nutrients. In a preferred embodiment, both *Tri-* choderma and white rots are used together in the bioremediation of a contaminated environmental area.

The amount of the fungus of the present invention to be used in the detoxification of any given area is within the skill of one in the art. Where the fungus is to be applied to seeds or composts or straw, for example, then it is generally preferred that, as a dry preparation, the propagules are applied at a rate of between 0.05% and 3% of the weight of the straw or seeds. A more preferred range is 0.2-2%, especially 0.5-1%. However, other suitable ranges will be readily established by those skilled in the art.

The invention will be further illustrated with respect to the following, non-limiting Example.

EXAMPLE 1

Catabolism of Cyanide by *Trichoderma* in Vitro and in Vivo

A number of strains of *Trichoderma* were investigated for their ability to protect lettuce seeds and seedlings from the effect of varying levels of cyanide.

The strains used in this Example were obtained from a range of sources. *T. harzianum* (TH1, IMI 275950) was isolated from wheat straw, *T. harzianum* (T4, IMI 298372) was isolated as an antagonist of *Rhizoctonia solani* [Ridout et al., (1986) J. General Microbiology 132:2345-2352], *T. harzianum* (T12, WT) were isolated from soil in Colombia, S. A., and *T. harzianum* (T12B and T95, benomyl resistant rhizosphere competent mutants of T12 and WT respectively) were obtained from Prof. R. Baker at Colorado State University and *T. harzianum* (NT4, IMI 351108), *T. hamatum* (NT11), *Trichoderma* (NT7) were obtained from Prof. J. Peberdy, Nottingham University. *T. pseudokoningii* (2TF2, IMI 322662) was isolated from onion tissue [Jackson et al., (1991) supra]. All other isolates *T. harzianum* (10, IMI 351107; 20, IMI 337473; 43, IMI 351105; 64, IMI 337475; 93, IMI 337479), *T. viride* (47, IMI 337474; 75, IMI 347477; 92, IMI 337478) and *Trichoderma* spp. (52, 53, 56, 91) were isolated from sclerotia of *Sclerotinia sclerotiorum* as part of a disease biocontrol programme.

Preparation and Incubation of *Trichoderma* Spore Suspensions.

Conidia of *Trichoderma* spp. were harvested from sporing cultures grown on Campbell's V8 juice agar under fluorescent lights. The cultures were flooded with 0.1M Tris-$H_2SO_4$ (THAM) buffer pH 7.0 to remove the conidia which were filtered through 2 layers of butter muslin, washed 3 times by centrifugation at 5,000 rev minute$^{-1}$ and resuspended in THAM buffer.

KCN in THAM buffer was added to sterile screw cap centrifuge tubes containing a spore suspension to give a final concentration of 1.0 mM KCN with a range of spore concentrations from $1.35 \times 10^1$-$1.35 \times 10^7$ (assay 1) and approx $1.0 \times 10^7$ spores ml$^{-1}$ (assay 2) in a total of 5 ml. Five replicate tubes were prepared for each treatment and the control, which consisted of KCN and buffer without spores. A series of blanks with spores only and no KCN was also set up. KCN standards were prepared in duplicate for each experiment in the range of 0-50 nmoles KCN. The centrifuge tubes were incubated at room temperature (22° C.).

Cyanide Assay

The presence of cyanide was measured before incubation and after 22 hours (assay 1) and after different time lapses until a maximum of 30 hours (assay 2) using Dartnall and Bums [Biol. Fertil. Soils (1987) 5:141-147]. This method is a modification of the technique of Miller and Conn [Plant Physiol. (1980) 65:1199-1202] originally adapted from Lambert et al [Analytic Chem. (1975) 47(6):916-918]. A spore/KCN sample was added to cool (0-4° C.) THAM buffer to give a final volume of 1 ml to which 1 ml N-chlorosuccinimide-succinimide oxidising reagent followed by 1 ml barbituric acid-pyridine reagent were added. Suba seals (W. Freeman, Barnsley) were inserted and the tubes were mixed thoroughly. After 10 minutes, the absorbance was read in a spectrophotometer (Phillips, Pye Unicam Ltd, Cambridge) at 578 nm. A standard curve of absorbance against cyanide (nmol) was plotted and used to convert absorbance data into cyanide nmol ml$^{-1}$ present. An analysis of variance was performed on square root transformed data (assay 1) and log transformed data (assay 2). Individual *Trichoderma* strains at different time intervals were compared at the p=0.002 level using t tests to identify the time taken for a significant amount of KCN to be catabolised. The approximate time for 50% of the KCN to be catabolised was also calculated.

Preparation of *Trichoderma* Inoculum for Pot Trial

The *Trichoderma harzianum* (T12) inoculum was prepared using the method of Lumsden et al., [Soil Biol. Biochem. 20:123-125 (1990)]. Conical flasks (1 liter) containing 500 ml molasses/yeast fermentation medium were inoculated with approximately one sixth of a fully colonised potato dextrose agar (PDA, Oxoid) plate and after shaking for 6 days at 25° C., the biomass produced was dried, ground and stored at 4° C.

Pot Trial

Strain T12 was tested in vivo in a pot trial for its ability to catabolise cyanide in compost contaminated with 10 mM, 0.1 mM, 1.0 mM and 10 mM KCN. The methods used were similar to those of Lynch et al., [Letts Appl. Microbiol. (1991), 12, 59-61].

A 50/50 peat sand potting compost mixture was prepared with the following additions (g/liter): potassium nitrate, 0.40, superphosphate 0.77, chalk, 0.63, frit 255WM (FENO Chemical Co) 0.40 and a pH of 6.53.

*Trichoderma* strain T12 was added at a rate of 1.0% dry w/w to potting compost in plastic bags and test amounts of KCN dissolved in 30 ml distilled water were dribbled over the surface of the compost in the same plastic bags. The compost was mixed thoroughly by hand after each addition. Pots (9 cm diameter) were half filled with uninoculated compost and the remaining half of each replicate pot was filled with inoculated compost. The control pots were filled with uninoculated compost only. The compost was tapped down lightly and five untreated lettuce seeds cv. Ravel were placed on the compost surface. The seeds were covered with a thin layer of the appropriate inoculated compost. The pots were watered from below positioned on capillary matting. The pots were covered for the first 3 days with polystyrene sheeting to prevent large fluctuations in temperature and to ensure uniform darkness during seed germination. The temperature of the glasshouse was set at 15° C. at night and 18° C. by day, with venting at 23° C.

Seed emergence was recorded daily and plant stand, shoot fresh and dry weight were recorded after 31 days. An analysis of variance was performed on all the data using a factorial design.

Cyanide Assays

The concentration of *T. harzianum* (TH1) spores incubated with 1.0 mM KCN had an effect on the amount of KCN catabolised. This amount was very toxic to germinating seeds but, with the addition of T12, germination of seeds in the presence of 1.0 mM KCN was not significantly different to germination in the presence of T12 only, and there was also some germination after 3 days.

The effect of adding T12 to compost contaminated with KCN was to significantly increase the fresh and dry shoot weights at all the concentrations of KCN tested, whereas 1.0 and 10 mM KCN significantly reduced yield in the absence of T12.

Most of the *Trichoderma* strains screened are able to catabolise cyanide, but the rate varies between isolates (Tables 2, 3 and 4). Of the 22 isolates tested *T. harzianum* (TH1, T12B, T4, T95, T12, NT4, 10, 43) were capable of catabolising a significant (p=0.002) amount of cyanide in <9 hours. Fifty percent of the cyanide present was degraded by 14 isolates in <25 hours with *T. harzianum* (TH1, T4, T95, NT4, 43) degrading 50% within 9 hours.

Pot Trial

Any tendency of *T. harzianum* (T12) to inhibit the germination of lettuce seed was significantly reduced when it was incorporated into compost contaminated with 10 mM and 0.1 mM KCN, and germination was also improved slightly in the absence of T12. KCN at 1.0 mM and 10 mM was very toxic to germinating seeds but, with the addition of T12, 1.0 mM KCN was not significantly different to T12 only and there was also some germination after 3 days.

The effect of adding T12 to compost contaminated with KCN was to significantly increase the fresh and dry shoot weights at all the concentrations of KCN tested, where as 1.0 and 10 mM KCN significantly reduced yield in the absence of T12. The fresh shoot weight of the T12 control was significantly greater than, and the dry shoot weight not significantly different to, the untreated control.

All the *Trichoderma* strains assayed catabolised cyanide. The rate varied with spore concentration and isolate. The response of TH1 indicated that a concentration of at least $10^5$ spores $ml^{-1}$ is required to degrade 500 nmol $ml^{-1}$ KCN in 24 hours. The following *Trichoderma* isolates incubated at a concentration of $10^7$ spores $ml^{-1}$ were the fastest to catabolise the KCN present, *T. harzianum* (TH1, T4, T95) and *Trichoderma* spp. (NT4 and 43) with T4 and 43 degrading 50% of the KCN between 3 and 6 hours.

Autoclaved TH1 spores were found not to degrade cyanide in earlier trials showing that the enzyme is not heat stable, but it has previously been established that autoclaved *Trichoderma* can promote plant growth.

Even in the absence of *T. harzianum*, it was surprisingly found the rate of lettuce seed germination was improved slightly by the addition of 10 µM and 0.1 mM KCN to the compost. Not surprisingly, KCN concentrations of 1.0 mM and 10.0 mM retarded germination. The results are shown in Table 5, below.

When *T. harzianum* (T12) was added to the compost, a slight inhibition of the seed germination rate was noted (results not shown) but, when added in conjunction with KCN concentrations of 10 µM and 0.1 µmM, the rate was improved. These results suggest that any inhibitory effects of the *Trichoderma* and the toxic effects of the cyanide have been reduced simultaneously. When *Trichoderma* is added to compost, it is possible that it produces a metabolite, or metabolites, similar to viridin, which inhibit germination in lettuce, and that cyanide inhibits any viridin production or its conversion to viridiol.

It can clearly be seen from Table 5 that, while KCN, at increasing concentrations, is toxic to lettuce seedlings, the presence of *T. harzianum* is sufficient to effectively completely overcome any toxic effects up to at least a concentration of 10 mM KCN.

TABLE 1

Effect of *T. harzianum* (TH1) spore concentration on catabolism of cyanide.

| | Cyanide present after time (hours)[a] | |
|---|---|---|
| No.[b] Spores $ml^{-1}$ | 0 | 22 |
| 0 | 30.14 | 29.00 |
| 1.35 | 29.68 | 28.08 |
| 2.35 | 29.65 | 27.78 |
| 3.35 | 29.32 | 24.31 |
| 4.35 | 28.57 | 25.53 |
| 5.35 | 27.98 | 24.47 |
| 6.35 | 27.68 | 17.92 |
| 7.35 | 28.94 | 12.24 |
| D.o.f[c] = 59 | | |
| SED[d] = 0.966 | | |

[a]Values are means of 5 replicate tubes which have been square root transformed
[b]Logarithmic number of spores
[c]Degrees of freedom
[d]Standard error difference of means

TABLE 2

KCN (nmol$ml^{-1}$) present after incubation with *Trichoderma* spores.

| *Trichoderma* Strain | Spores | Means not | Time (hours)[a] | | | | | |
|---|---|---|---|---|---|---|---|---|
| Exp 1 | ($ml^{-1} \times 10^7$) | determined | 3 | 6 | 9 | 24 | 27 | 30 |
| Cont | — | 6.76 | 6.69 | 6.77 | 6.67 | 6.81 | 6.80 | 6.77 |
| TH1 | 0.89 | 6.89 | 6.68 | 5.21 | 3.11 | — | — | — |
| T4 | 2.90 | 6.72 | 6.60 | 5.05 | 2.77 | 7 | — | — |
| NT4 | 3.60 | 6.61 | 6.38 | 6.07 | 4.87 | — | — | — |
| T12 | 6.00 | 6.68 | 6.64 | 6.56 | 6.17 | — | — | — |
| NT11 | 8.20 | 6.31 | 6.54 | 6.45 | 6.44 | 5.12 | 4.19 | 3.13 |
| 56 | 0.69 | 6.50 | 6.61 | 6.61 | 6.47 | 4.93 | 5.11 | 4.79 |
| NT7 | 3.30 | 6.57 | 6.64 | 6.54 | 6.55 | 6.18 | 5.95 | 5.66 |

TABLE 2-continued

KCN (nmolml$^{-1}$) present after incubation with *Trichoderma* spores.

| WT | 0.77 | 6.92 | 6.83 | 6.67 | 6.61 | 6.84 | 6.72 | 6.81 |
|---|---|---|---|---|---|---|---|---|
| 64 | 0.33 | 6.58 | 6.58 | 6.48 | 6.50 | 6.46 | 6.36 | 6.26 |
| D.o.f[b] | | 36 | 36 | 36 | 36 | 20 | 20 | 20 |
| SED[c] | | 0.0864 | 0.0696 | 0.0944 | 0.2188 | 0.1809 | 0.0742 | 0.100 |

| Exp 2 | | 0 | 3 | 6 | 9 | 25 | 28 | 31 |
|---|---|---|---|---|---|---|---|---|
| Cont | — | 6.63 | 6.67 | 6.68 | 6.67 | 6.61 | 6.57 | 6.60 |
| TH1 | 1.01 | 6.44 | 6.44 | 6.08 | 5.64 | — | — | — |
| 43 | 1.00 | 6.62 | 6.61 | 5.85 | 4.17 | — | — | — |
| 20 | 1.01 | 6.57 | 6.59 | 6.53 | 6.45 | 5.38 | — | — |
| 52 | 0.40 | 6.37 | 6.41 | 6.38 | 6.29 | 5.97 | 5.75 | 5.48 |
| 2TF2 | 1.02 | 6.49 | 6.36 | 6.59 | 6.35 | 6.42 | 6.34 | 6.26 |
| WT | 0.93 | 6.61 | 6.74 | 6.63 | 6.59 | 6.33 | 6.26 | 6.05 |
| T95 | 0.16 | 6.58 | 6.45 | 6.56 | 6.37 | 5.52 | 5.20 | — |
| 47 | 0.44 | 6.40 | 6.23 | 6.25 | 6.19 | 6.36 | 5.51 | 4.86 |
| 92 | 0.59 | 6.46 | 6.48 | 6.58 | 6.27 | 3.14 | — | — |
| D.o.f[b] | | 36 | 36 | 36 | 36 | 28 | 20 | 13 |
| SED[c] | | 0.0452 | 0.0524 | 0.0586 | 0.0814 | 0.2658 | 0.054 | 0.328 |

| Exp 3 | | 0 | 3 | 6 | 9 | 24 |
|---|---|---|---|---|---|---|
| Cont | — | 6.86 | 6.80 | 6.72 | 6.73 | 6.82 |
| TH1 | 1.01 | 6.75 | 6.60 | 5.79 | 4.06 | — |
| 47 | 1.00 | 6.71 | 6.76 | 6.71 | 6.45 | 5.20 |
| 53 | 0.55 | 6.63 | 6.66 | 6.58 | 6.34 | 4.77 |
| D.o.f[b] | | 12 | 12 | 12 | 12 | 8 |
| SED[c] | | 0.0735 | 0.0582 | 0.0475 | 0.0498 | 0.1263 |

| Exp 4 | | 0 | 3 | 6 | 9 | 25 | 27 | 30 |
|---|---|---|---|---|---|---|---|---|
| Cont | — | 6.87 | 6.79 | 6.70 | 6.88 | 6.82 | 6.79 | 6.74 |
| TH1 | 1.04 | 6.78 | 6.61 | 6.46 | 6.47 | 4.96 | — | — |
| T95 | 1.01 | 6.78 | 6.65 | 6.30 | 4.92 | — | — | — |
| 10 | 1.00 | 6.67 | 6.76 | 6.38 | 6.00 | — | — | — |
| T12B | 1.02 | 6.82 | 6.61 | 6.56 | 6.29 | — | — | — |
| 75 | 1.00 | 6.67 | 6.72 | 6.63 | 6.72 | 6.34 | 6.26 | 6.07 |
| 64 | 1.03 | 6.74 | 6.78 | 6.63 | 6.75 | 6.40 | 6.23 | 6.07 |
| 91 | 1.03 | 6.64 | 6.76 | 6.54 | 6.68 | 6.51 | 6.39 | 6.25 |
| 93 | 1.01 | 6.71 | 6.73 | 6.68 | 6.59 | 6.66 | 6.54 | 6.66 |
| WT | 1.01 | 6.84 | 6.72 | 6.80 | 6.99 | 6.65 | 6.55 | 6.56 |
| D.o.F[b] | | 36 | 36 | 36 | 36 | 24 | 20 | 20 |
| SED[c] | | 0.0445 | 0.0356 | 0.0473 | 0.0794 | 0.0427 | 0.0366 | 0.073 |

TABLE 3

Time taken for *Trichoderma* spores to degrade 50% of the KCN present at the outset
Time (hours)

| 3-6 | 6-9 | 9-25 | 25+ |
|---|---|---|---|
| TH1/1[a] | NT4/1 | T12/1 | Control/I |
| T4/1 | TH1/2 | NT11/1 | NT7/1 |
| 43/2 | TH1/3 | 56/1 | WT1 |
| | T95/4 | 20/2 | 64/1 |
| | | T95/2 | Control/2 |
| | | 92/2 | 52/2 |
| | | 47/3 | 2TF2/2 |
| | | 53/3 | WT/2 |
| | | TH1/4 | 47/2 |
| | | 10/4 | Control/3 |
| | | T12B/4 | Control/4 |
| | | | 75/4 |
| | | | 64/4 |
| | | | 91/4 |
| | | | 93/4 |
| | | | WT/4 |

[a]Experiment number

TABLE 4

Time taken for *Trichoderma* spores to degrade a significant amount of KCN, taking p = 0.02.

| Time (hours) | | | | | | | | No Signif. |
|---|---|---|---|---|---|---|---|---|
| 0–3 | 3–6 | 6–9 | 9–17 | 17–19 | 19–25 | 25–31 | 31–40 | diff. |
| TH1/1* | T4/1 | T12/1 | 52/2 | 20/2 | 56/1 | 91/4 | 93/4 | Con/1 |
| NT4/1 | TH1/2 | | | T95/2 | NT11/1 | | | WT/1 |
| T12B/4 | 43/2 | | 92/2 | | NT7/1 | 47/2 | | 64/1 |
| | TH1/3 | | 47/3 | | WT/2 | | | Con/2 |
| | TH1/4 | | 53/3 | | 75/4 | | | Con/3 |
| | T95/4 | | | | 64/4 | | | Con/4 |
| | 10/4 | | | | WT/4 | | | 2TF2/2 |

/1 and /2 refer to different experiments

TABLE 5

Effect of *T. harzianum* (Tl2) and KCN on the growth of lettuce plants

| | Shoot wt. Fresh | per pot (g) Dry |
|---|---|---|
| +*T. harzianum* (Tl2) | | |
| Control - no KCN | 35.63 | 2.29 |
| KCN 10.0 μm | 36.54 | 2.44 |
| 0.1 mM | 37.88 | 2.61 |
| 1.0 mM | 35.92 | 2.24 |
| 10.0 mM | 38.01 | 2.32 |
| −*T. harzianum* (Tl2) | | |
| Control - no KCN | 27.99 | 2.02 |
| KCN 10.0 μM | 29.16 | 2.13 |
| 0.1 mM | 29.53 | 2.01 |
| 1.0 mM | 24.09 | 1.51 |
| 10.0 mM | 18.14 | 0.88 |
| D. of F 46 | | |
| SED | 1.44 | 0.134 |

The invention claimed is:

1. A method for the detoxification of an environmental area, said method comprising the application to said area of a bioremediatory fungus or spores thereof, together with a compatible rhizosphere, or progenitor therefor, wherein said fungus is a species of *Trichoderma* able to catabolise cyanides.

2. A method according to claim 1, wherein said fungus further comprises at least one fungus selected from the group consisting of *Fusarium* spp. and white rot.

3. A method according to claim 2, wherein the fungus further comprises white rot.

4. A method according to claim 1, wherein the environment to be treated is an area of land or a body of water.

5. A method according to claim 1, wherein an additional source of nutrients, capable of independently supporting growth of the fungus or fungi, is applied to the area.

6. A method according to claim 5, wherein the additional source of nutrients is dried or dead plant material.

7. A method according to claim 6, wherein the material is straw.

8. A method according to claim 6, further comprising a dinitrogen-fixer.

9. A method according to claim 8, wherein said dinitrogen-fixer is *Clostridium butyricum.*

10. A method according to claim 6, further comprising a polysaccharide-producer.

11. A method according to claim 10, wherein said polysaccharide-producer is *Enterobacter cloacae.*

12. A method according to claim 6, wherein at least one fungus is *Trichoderma harzianum.*

13. A method according to claim 1, wherein the rhizosphere or progenitor therefor comprises propagative vegetable tissue in close association with, or inoculated by, the fungus or fungi.

14. A method according to claim 13, wherein the tissue is selected from the group consisting of dried roots, dormant roots, corms, rhizomes, and bulbs.

15. A method according to claim 13, wherein the propagative material is derived from a non-food crop.

16. A method according to claim 13, wherein the propagative material is capable of enriching the soil and/or taking up heavy metals.

17. A method according to claim 16, wherein the plant is a legume or a fern.

18. A method according to claim 17, further comprising propagules of an appropriate *Rhizobium.*

19. A method according to claim 17, wherein the plant is a vetch or a clover.

20. A method according to claim 19, further comprising propagules of an appropriate *Rhizobium.*

21. Propagative material prepared by the method of claim 13.

22. Material according to claim 21, further comprising white rot fungus.

23. Straw, or other dead plant material capable of serving as a source of nutrients, in intimate association with one or both of *Clostridium butyricum* and an *Enterobacter* spp., a strain of *Trichoderma* capable of catabolising cyanide, and white rot fungus.

* * * * *